Figure 1:
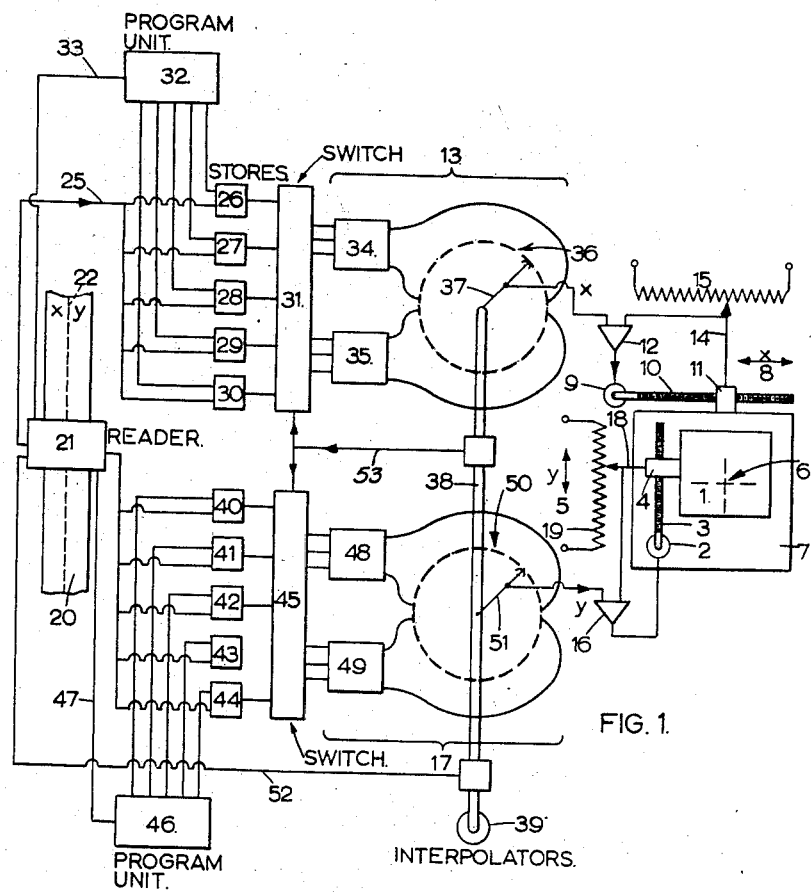

March 22, 1960

R. E. SPENCER ET AL 2,929,555

AUTOMATIC CONTROL MECHANISM AND
INTERPOLATING DEVICES THEREFOR

Filed April 27, 1956

3 Sheets-Sheet 1

Inventors
R. E. Spencer
F. C. Wolfendale
By Glascock Downing Seebles
Attys.

United States Patent Office 2,929,555
Patented Mar. 22, 1960

2,929,555

AUTOMATIC CONTROL MECHANISM AND INTERPOLATING DEVICES THEREFOR

Rolf Edmund Spencer, West Ealing, London, and Frederick Caleb Wolfendale, Ealing, London, England, assignors to Electric & Musical Industries Limited, Hayes, England, a company of Great Britain Application April 27, 1956, Serial No. 581,038

Claims priority, application Great Britain April 27, 1955

6 Claims. (Cl. 235—151)

This invention relates to quadratic interpolating devices and automatic control mechanism for machine tools in which such devices are used.

In United States patent application Serial No. 459,814 there is described a quadratic interpolating device comprising a series of output contacts which are intercoupled by two systems of transformer windings in such a way that on feeding alternating electrical signals to three points on the systems of windings, electro-motive forces are set up at the output contacts which represent ordinates of a series of points on a quadratic curve drawn through points represented by the applied signals. Such an interpolating device may find application, for example, in automatic control mechanism for machine tools and in such an application the applied signals may represent the $y$ co-ordinates of successive points on the locus of the tool axis which points are for convenience termed reference points. The output contacts of the interpolator are equi-angularly spaced about an axis and are scanned by a contact brush rotatable about said axis, so that the contact brush picks up successive voltages representing $y$-co-ordinates of successive closely spaced points between reference points. The brush rotates at a rate directly related to the rate of change of the $x$-co-ordinate of the locus, so that the position of the brush represents the instantaneous $x$-co-ordinate of the tool axis. Since the contacts are equi-spaced, the output signals derived by the brush correspond directly to equal increments of the independent variable, which in this case is $x$. The input signals may thus be said to be functions of a geometric independent variable. It will be appreciated that with an arrangement such as described when the three input signals to the interpolator are linearly related, the output signals of the interpolator will also be linearly related.

The interpolation is equivalent to fitting a span of a parabola, with its axis parallel to the $y$-axis, to pass through three reference points. However, the curvature of any span of a parabola, which does not include the vertex, either continuously increases or continuously decreases, whereas the curve to be copied by the machine may have a curvature which is constant, or even varying in the opposite direction. Hence the employment of parabolic interpolation in the manner indicated above will, in general, lead to a residual error which will pass from one sign to the other at the centre of the span, being generally of cubic form. This means that the spacing of the reference points has to be restricted to maintain the error within permissible bounds.

Furthermore, in the interpolating device described in the aforesaid co-pending patent application, two interpolators are provided for each dependent variable and outputs are taken from the two interpolators alternately. For example if one of the interpolators receives input signals corresponding to the ordinates of three successive reference points, say $y_{n-1}$, $y_n$ and $y_{n+1}$, an output is derived from this interpolator from midway between $y_{n-1}$ and $y_n$ to midway between $y_n$ and $y_{n+1}$. While this is in progress, signals corresponding to the ordinates $y_n$, $y_{n+1}$ and $y_{n+2}$ are set up as the input information for the other interpolator which interpolates in the span $y_n$ to $y_{n+2}$, and switching over from one interpolator to the other occurs midway between the reference points $y_n$ and $y_{n+1}$. As a result switching over occurs, in general, where the cubic errors arising from the two interpolators are of opposite sign, so that steps are liable to occur in the output. This arrangement has moreover the disadvantage that it prevents the turning of sharp corners unless a special coding technique is adopted.

The object of the present invention is to reduce some or all of the disadvantages mentioned in the preceding paragraphs.

According to the present invention there is provided an interpolating device, especially for automatic control mechanism for machine tools, comprising means for deriving first input signals representing values of a first co-ordinate of successive reference points defining a locus, means for deriving second input signals representing values of a second coordinate of successive reference points defining said locus, first interpolating means responsive to said first input signals for generating first output signals representing values of said first co-ordinate at intermediate points on said locus, second interpolating means responsive to said second input signals for generating second output signals representing values of said second co-ordinate at intermediate points on said locus, said first and second interpolating means being arranged to generate the respective output signals as curvilinear functions of a common non-geometric parameter.

The expression "non-geometric parameter" used herein and in the claims is intended to mean an independent variable which is not a co-ordinate of said locus. The non-geometric parameter may be time or may simply be the serial number of the points represented by the input signals to the interpolating means.

As will appear, the invention as applied to automatic control mechanism allows greater flexibility of control and allows the reference points to be chosen so that the generated function best matches its changing curvature to the changing curvature of the desired locus. As the interpolation is curvilinear, at least three input signals are required at any one time for each interpolating means, and it is possible to vary the span of the locus corresponding to the input signals and also to vary the intermediate point on the span represented by an intermediate input signal. The invention also allows the rate of cutting to be controlled in such a way that the cutting tool can be brought to a stop at points where a sudden change of direction occurs.

According to another feature of the invention, each interpolating means comprises two interpolators arranged to interpolate over alternate spans of the desired locus, said interpolators being such that the transfers from one interpolator to the other occur at reference points.

Figure 2:
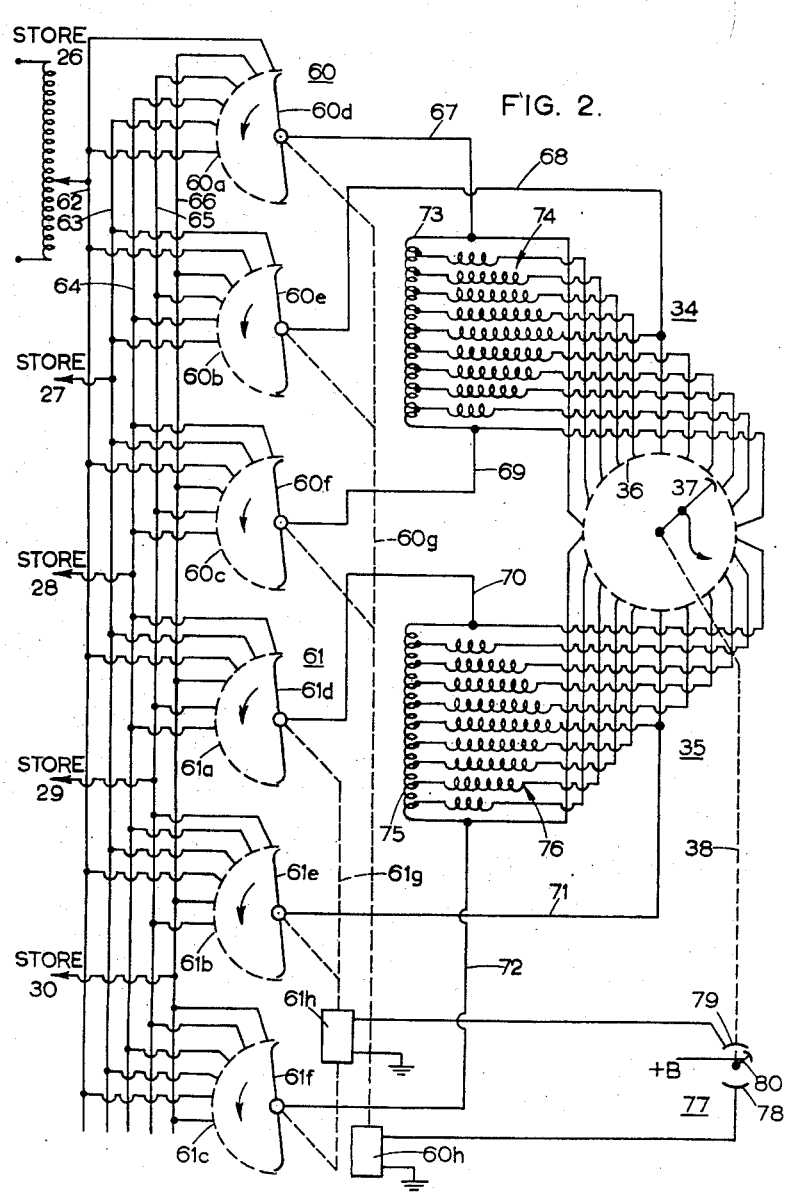
Figure 3:
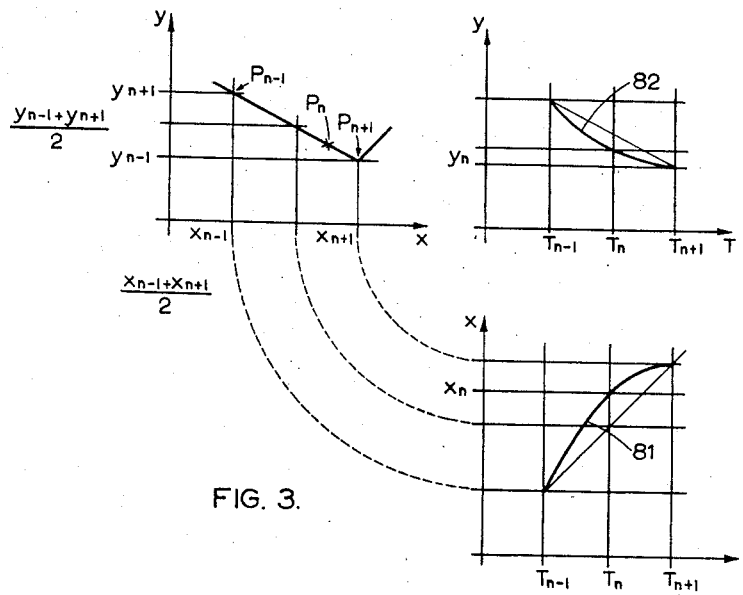

In order that the invention may be clearly understood and readily carried into effect, the invention will be described with reference to the accompanying drawings, in which:

Figure 1 illustrates diagrammatically and mainly in block form one example of a machine tool incorporating automatic control mechanism in accordance with one example of the present invention, Figure 2 illustrates in more detail the construction of the selector switch and interpolating means employed in Figure 1, and Figure 3 comprises graphs explanatory of the operation of the invention.

Referring to the drawing, reference 1 represents the worktable of an automatic machine, for example an automatic milling machine, mounted on a slide so that it can be displaced in a horizontal plane in one co-ordinate direction by a servo-motor 2 through the intermediary of a lead screw 3 and nut 4. The servo motor 2 can effect displacements in the directions denoted by the arrow 5 and it controls the y co-ordinate displacement of the worktable 1 with respect to the axis of the tool holder, which is represented in the drawing by the reference 6, and may be taken at determining the origin of a two dimensional co-ordinate system. The slide on which the table 1 is mounted is represented by the rectangle 7 and the slide can be moved in a horizontal plane in the directions indicated by the arrow 8 by means of a servo-motor 9, through the intermediary of screw and nut mechanism 10 and 11. The servo-motor 9 therefore controls the $x$ co-ordinate displacement between the worktable 1 and the axis 6 of a tool holder. The tool holder itself is not shown in the drawing. Relative displacements between the table 1 and the tool holder in the indicated co-ordinate directions are denoted respectively by $x$ and $y$ and in practice are controlled to cause the tool axis to describe a locus such that a desired profile is cut on a workpiece secured to the table 1. The operation of the servo-motor 8 is controlled by the output of an amplifier 12 which receives virtually continuously variable input signals from quadratic interpolating means represented in general by the reference 13 and negative feedback signals from the tap 14 of potentiometer 15, the tap being driven in known manner so that the signal derived from the potentiometer is a voltage analogue of the instantaneous value of $x$.

Similarly the servo-motor 2 derives its input signal from an amplifier 16 which receives a virtually continuously variable input signal from quadratic interpolator means represented in general by the reference numeral 17. The amplifier 16 also receives a negative feedback signal which is the analogue of the instantaneous value of $y$ from the tap 18 of potentiometer 19. The quadratic interpolating means 13 and 17 set up, as output signals, alternating voltages having amplitudes which are analogous to the desired values of $x$ and $y$ at any instant and the potentiometers 15 and 19 are energised with alternating voltages of fixed amplitude and having the same phase as the output voltages from the quadratic interpolating means. The amplifiers 12 and 16 may, it will be understood, incorporate rectifying means as required.

The quadratic interpolating means 13 and 17 are responsive to signals representing discrete values of $x$ and $y$ recorded on a punched tape 20 and derived therefrom by means of a tape reader 21. The values on the tape are recorded in two columns the division between which is represented in the drawing by the dotted line 22. It will be assumed that the column to the left of 22 contains successive discrete values of $x$ and the column to the right of 22 contains successive discrete values of $y$. It will also be assumed that each row of holes recorded on the tape corresponds to a single value of $x$ and the corresponding value of $y$, the rows being equally spaced. Each row thus represents the $x$ and $y$ co-ordinates of a reference point of the locus to be described by the axis 6 of the tool holder, the span of the locus between successive reference points being chosen during the preparation of the record 20 to suit the curvature of the locus, as will be described subsequently. The tape reader may be, for example, of the construction described in United States patent application Serial No. 518,912, now Patent No. 2,887,638. In this case when the tape reader is operated to sense a recorded value of say $x$, the output is in the form of a group of pulses which is a binary-decimal code representation of the corresponding value of $x$. This group of pulses is applied by a series of parallel conductors, which are represented in the drawing by a single connection 25, to five temporary stores denoted by the references 26 to 30 inclusive. The stores 26 to 30 are normally insensitive to signals applied to them by the tape reader but are sensitised in cyclic order by a programme unit 32, an interlock being provided by the connection 33 between the programme unit 32 and the tape reader 21 to ensure proper synchronism between the tape reader 21 and the programme unit 32. The temporary stores 26 to 30 and the programme unit 32 may be of similar general construction as the corresponding units described in United States patent application Serial No. 518,912, now Patent No. 2,887,638.

For the purposes of the present application each store may be regarded merely as an auto-transformer, the tap on which is set in response to binary decimal code signals applied to it from the tape 20, so that the alternating voltage derived from the tap has an amplitude which is the analogue of the corresponding co-ordinate value. This is illustrated in Figure 2 in the case of store 26, in which 60a denotes the auto-transformer having an adjustable tap 60d, the auto-transformer being energised from the reference alternating current source of the control mechanism. Therefore when any of the stores 26 to 30 is sensitised to receive the output from the tape reader 21, the respective store is caused to set up an alternating voltage whose amplitude is the analogue of the corresponding reference point value of $x$ derived from the record 20. The voltage analogues set up by stores 26 to 30 are applied by a selector switch 31 in successive groups of three to the three input terminals of a quadratic interpolator 34 and to the three input terminals of a second quadratic interpolator 35, the interpolators 34 and 35 forming part of the means 13. The switch 31 and the interpolators 34 and 35 will be described in more detail subsequently with reference to Figure 3. Each of the interpolators 34 and 35 has eleven output studs, and the two groups of output studs are arranged to form a stud circle represented by the dotted line 36. The end studs of each group of eleven are however "half" studs, such that each half stud forms, with the adjacent half stud of the other interpolator a composite stud which, though composed of two electrically separate halves, corresponds in other ways to the other studs. In Figure 1, for simplicity, output connections are shown from the interpolators to the first and last "half" studs of each group only. The stud circle 36 is scanned by a contact brush 37 mounted on a shaft 38 which is driven by an electric motor 39. The operation of the selector switch 31 is controlled by the shaft 38, as indicated by the connection 53 so that when a sequence of signals representing the $x$ co-ordinates of successive reference points, say $x_1$, $x_2$, $x_3$ . . . etc., are applied in cyclic order to the stores from the record 20, $x_1$, $x_2$ and $x_3$ are applied to the interpolator 34 and $x_3$, $x_4$ and $x_5$ are applied to the interpolator 35. Then $x_5$, $x_6$ and $x_7$ are applied to the interpolator 34, $x_7$, $x_8$ and $x_9$ are applied to the interpolator 35 and so on. After the stores 26, 27 and 28 have been sensitised to set up the three voltage analogues $x_1$, $x_2$ and $x_3$, interpolation can be started by rotation of the shaft 38 to cause the contact 37 to traverse the group of output studs of the interpolator 34 and thus interpolate over the full span from $x_1$ to $x_3$. While this is in progress the analogues $x_4$ and $x_5$ are set up in the stores 29 and 30 and $x_3$, $x_4$ and $x_5$ are applied to the input terminals of the interpolator 35, so that as continued rotation of the shaft carries the contact 37 to the group of output studs of the interpolator 35, the interpolator is in a condition to take over from the interpolator 34 and produce interpolation in the span from $x_3$ to $x_5$. This sequence of operation continues until the instructions on the tape 20 end. It will be appreciated that the selector switch 31 is required virtually to advance the stores 26 to 30 by one position, with respect to the input terminals of the interpolators 34 and 35 once per half revolution of the shaft 38. As described in United States Patent application Serial No. 459,814 the output voltages are alternating voltages and the brush 37 is of the make-before-break type, so that a virtually continuously variable output voltage is picked up by the brush, this voltage being the input signal to the amplifier 12.

Signals representing the y co-ordinates of successive reference points derived from the tape reader 21 are applied by a connection 54 to a further series of five temporary stores 40 to 44, sensitised in the same way as the stores 26 to 31 by a programme unit 46 which is interlocked with the tape reader as represented by a connection 47. The voltage analogues set up by the stores 40 to 44 are applied by a selector switch 45 to the three input terminals of a quadratic interpolator 48 and to the three input terminals of another quadratic interpolator 49 in the same kind of sequence as that described for the stores 26 to 30 and the interpolators 34 and 35. The interpolators 48 and 49 form part of the interpolating means denoted in general by the reference 17 and their output voltages are applied to the respective halves of a stud circle 50 corresponding to the stud circle 36. The stud circle 50 is scanned by a make-before-break contact brush 51 mounted on the same shaft 38 and in the same relative position as the contact 37. The voltage picked up by the contact 51 forms the input signal to the amplifier 16 for the servo-motor 2. As aforesaid shaft 38 is driven by servo-motor 39 and a synchronous link represented by the connection 52 is provided between the shaft 38 and the tape reader 21, to ensure that the interpolating means 13 and 17 do not over-run the tape reader since it will be appreciated that the tape reader must always be at least three positions ahead of the interpolating means.

As shown in Figure 2, the switch 31 comprises two uniselectors or stepping switches 60 and 61 each having three banks of contacts. The contact banks of the uniselector 60 are denoted by the references 60a, 60b and 60c and the respective wipers are denoted by the references 60d, 60e and 60f. It will be understood that the wipers are mounted on a common shaft represented by the dotted line 60g which is driven by stepping mechanism in such a way that the wipers are rotated step by step from one contact-engaging position to another in response to the application of successive impulses to the stepping mechanism. The stepping mechanism for uniselector 60 is represented merely by the block 60h since the construction of uniselectors is well known. Similarly the uniselector 61 has three contact banks 61a, 61b and 61c and corresponding wipers 61d, 61e and 61f, mounted on a common shaft represented by the dotted line 61g which can be rotated step by step by stepping mechanism 61h. The number of contact studs on each bank of the uniselectors 60 and 61 may be any multiple of five, and ten studs are shown on each bank. The studs are connected in predetermined order to five bus-bars which carry the voltage analogue outputs from the stores 26 to 30, the bus-bars being denoted by the references 62 to 66 respectively. To simplify the drawing connections are shown to only five studs of each contact bank and it will be understood that the connections to the other five studs of each bank are the same as for the five which are shown. The electrical output signals from the wipers of the uniselector 60 are applied by leads 67, 68 and 69 to the input points of the quadratic interpolator 34. Similarly the electrical output signals from the wipers of the uniselector 61 are applied by leads 70, 71 and 72 to the three input points of the parabolic bridge 35. The parabolic bridge 34 comprises an auto-transformer 73 eleven regularly spaced points on which are connected to the eleven studs on the upper half of the stud circle 36. The connections from the points on the auto-transformer 73 to the stud circle 36 selectively include a series of windings denoted in general by 74 which are inductively coupled to each other but not to the winding 73. The windings 74 are termed parabolic windings and have numbers of turns which are related to each other in accordance with a quadratic law, as described in United States patent application Serial No. 459,814. Indeed the parabolic interpolator 34 is generally of the same construction as described in this patent application and differs only in that the output connections extend over the full span of the auto-transformer 73 between the points connected to the input leads 67 and 69. Therefore when input signals are applied to the interpolator 34 representing the x co-ordinates of three reference points, the output signals are generated over the full span of the desired locus between the input reference points. The interpolator 35 is of the same construction as the interpolator 34 and comprises the auto-transformer 75 and the series of parabolic windings 76. The control of the switch 31 by means of the shaft 38 is achieved, for example, by means of a switch 77 which has two contacts 78 and 79 and a brush 80 mounted on the shaft 38. The brush 80 is connected to a suitable source of positive potential and the contacts 78 and 79 are connected respectively to the stepping mechanism 60h and 61h of the uniselectors 60 and 61. Evidently the switch 77 causes a pulse to be applied to each of the uniselectors once per revolution of the shaft and the timing of this pulse is arranged to be such that the uniselector 61 is advanced by one step when the contact 37 is deriving an output from the interpolator 34. Similarly, the uniselector 60 is advanced by one step when the brush 37 is deriving an output from the interpolator 35. Furthermore, it is apparent from an examination of the connections from the stores 26 to 30 to the contact banks of the uniselectors 60 and 61 that as the uniselectors are advanced step by step in the manner indicated, the x co-ordinates of successive reference points are applied in the appropriate sequence and alternately to the interpolators 34 and 35.

In operation of the arrangement illustrated, the interpolators 13 and 17 generate values of both x and y, intermediate the values at the reference points derived from the record 20, as quadratic functions of a common non-geometric parameter. This parameter is represented by the angular displacement of the shaft 38 and if it is assumed that the shaft rotates at a constant rate, when the machine is operating, the parameter is time, and is denoted herein by T. At any instant, therefore, when the effective input signals to the interpolating means 13 represent the x co-ordinates $x_{n-1}$, $x_n$ and $x_{n+1}$ of three reference points $p_{n-1}$, $p_n$ and $p_{n+1}$ on the desired locus of the axis 6, and the effective input signals to the interpolating means 17 represent the y co-ordinates $y_{n-1}$, $y_n$ and $y_{n+1}$ of the same reference points, then it can be shown that instantaneous input signals to the amplifiers 12 and 16 (namely the output signals of the interpolators 13 and 17) are respectively $$x = x_n + \frac{x_{n+1}-x_{n-1}}{2} \cdot T + \frac{x_{n+1}+x_{n-1}-2x_n}{2} \cdot T^2$$

$$y = y_n + \frac{y_{n+1}-y_{n-1}}{2} \cdot T + \frac{y_{n+1}+y_{n-1}-2y_n}{2} \cdot T^2$$

In these relationships T takes values $-1$, $0$ and $+1$ at $p_{n-1}$, $p_n$ and $p_{n+1}$ respectively.

The theory of operation of the quadratic interpolating means as such is explained in United States patent application Serial No. 459,814.

The above relationship may be written as $$x = a_1 T^2 + b_1 T + C_1$$
$$y = a_2 T^2 + b_2 T + C_2$$

It will be seen that the existence of the term $a_1 T^2$ means that the spacing of the reference points are not equal in the x direction. From either pair of equations, by eliminating T, it can be found that the generated curve in x, y, is a parabola whose axis lies in a direction determined by the ratio of $a_1$ to $a_2$, or the corresponding expressions in terms of the co-ordinates of the reference points. In fact, it can be shown that the axis is parallel to the line joining $(x_n, y_n)$ to the mid point of the chord joining $(x_{n-1}, y_{n-1})$ to $(x_{n+1}, y_{n+1})$. Thus, given the two end points of a span to be covered by the input signals to the interpolating means, there is freedom to choose as the intermediate reference point any appropriate point on the desired locus, and by so doing to choose that parabola which, while intersecting the desired curve at each of three reference points, best matches its changing curvature to the desired locus.

Alternatively, where it is important that spans should blend together, as in generating airfoil sections, another approach may be adopted by virtue of the present invention. Thus, with the end of a span already selected and tangents to the desired locus drawn at these points, a parabola can then be chosen to touch the two tangents at the reference points. In following this parabola, the error normal to the curve (which is the significant error) is tangentially zero at the two end points, and therefore is predominantly quartic or quintic in character, thus demonstrating the facility to eliminate the cubic error given by the freedom to choose the axis of the parabola. The intermediate point which will generate the parabola touching the tangents to the desired locus at the reference points, bisects the line from the intersections of the tangents to the mid-point of chord from $(x_{n-1}, y_{n-1})$ to $(x_{n+1}, y_{n+1})$.

It will also be observed that each of the interpolating means 13 and 17 is so arranged that switching over from one interpolator (say 34) to the other (say 35) occurs at a reference point in the generated locus. At these points errors are either zero or equal on the parabolic spans generated by the respective interpolators, and no steps arise in the output signal from the contact (say 37). For example if the interpolators 34 and 48 are used for interpolating $x$ and $y$ over the whole span covered by three reference points $p_1$, $p_2$ and $p_3$, the interpolators 35 and 49 are used for interpolation over the whole range covered by the reference points $p_3$, $p_4$ and $p_5$ and the transfer from one interpolator to the other occurs exactly at the point $p_3$. In this case the only links between the curves traced by the interpolators over the ranges $p_1$, $p_3$ and $p_3$, $p_5$ are the values of the co-ordinates at $p_3$. Therefore $p_3$ can be a point of discontinuity of all differential coefficients. The same applies to all alternate reference points $p_1$, $p_3$, $p_5$ and so on but not to the intermediate reference points $p_2$, $p_4$ and so on, and for this reason the former odd-numbered points may be referred to as primary reference points whereas the even-numbered reference points may be referred to as secondary reference points.

In preparing instructions for an automatic machine tool controlled by an interpolating device according to the present invention, primary reference points are set at every point where the tool is required to change its direction of motion relative to the workpiece. Secondary reference points, that is $p_2$, $p_4$ etc., are spaced between the primary reference points, together with additional primary reference points if the intervals between corners are too large, taking account of the fact that the reference points should not be spaced further apart than implies a quadratic component within the capacity of the interpolators. Moreover, by virtue of the use of a non-geometric parameter, the spacing of the primary reference points on a curve may be arranged to decrease as the curvature increases, and in the case of a gradually increasing curvature the secondary reference points need not be equally spaced between the primary reference points but may be displaced towards the direction of greater curvature, whereby an apparent performance of higher order than quadratic can be obtained, as aforesaid. In most cases each secondary reference point may be placed as nearly as possible at the greatest lateral excursion of the desired locus from the chord joining the respective primary reference points.

It is also possible by virtue of the invention to vary the rate of travel of the tool on straight spans of the locus. This facility is advantageous when the tool has to travel to or from a corner at which there is a sudden change of direction. Assume for example that the locus of the axis 6 includes a straight span between reference points $p_{n-1}$ and $p_{n+1}$ and undergoes a sudden change of direction at $p_{n+1}$ as indicated in Figure 3. In this case if the intermediate reference point $p_n$ is not equally spaced between $p_{n-1}$ and $p_{n+1}$, the effect of the quadratic interpolation is to produce a uniform acceleration or deceleration of the tool along the straight path, so that it is possible to ensure a highly satisfactory distribution of stresses in the machine. For example, in the case shown in Figure 3, if the secondary reference point $p_n$ divides the line $p_{n-1}$ $p_{n+1}$ in the ratio of 3:1, the output voltages generated by the interpolating means 13 and 17 are then the quadratic functions of T represented by the curves 81 and 82 shown in Figure 3. The moduli of $$\frac{dx}{dT} \text{ and } \frac{dy}{dT}$$

decrease linearly with time and are both zero at $p_{n+1}$. The rate of travel of the tool is therefore zero at $p_{n+1}$ so that the machine is ready to start cutting in a new direction. In practice however it is preferable to arrange that the ratio is slightly less than the critical ratio of 3:1 because any value over 3 will cause an overshoot by the tool which would be disadvantageous if cutting an inside profile. In a practical case, when approaching a point at which it is desired to bring the tool to a stop and change the cutting direction, successive intervals between the reference points may be approximately in the ratio

4:4:3:1 so that no sudden retardation of the tool occurs on reaching the uniform retarding zone.

To simplify illustration of the invention, in the control mechanism shown in the drawing, the output voltages are shown as being derived from the output points of the parabolic interpolators 34, 35, 48 and 49. However the output voltages may be subjected to linear sub-interpolation, as described in United States patent application Serial No. 459,814. In this case the motor 39 may drive the "high speed" shaft of the linear subinterpolator, and the contacts 37 and 51 may be advanced intermittently by a stepping switch controlled by the high speed shaft. In any case, although the output voltages $x$ and $y$ are virtually continuously variable voltages, in fact they vary in small discrete steps as the output contacts move from one output stud to another of the stud circles 36 and 50 or the corresponding stud switches of the linear sub-interpolations. If the interpolation rate is not constant, the non-geometric parameter with respect to which interpolation is effected will not be time, but may then be regarded as the serial number of the reference points.

The potentiometers 14, 15 and 18, 19 may also be much more elaborate than represented in the drawing, to achieve the necessary degree of accuracy.

Other forms of records than a punched tape can be used for recording the values of $x$ and $y$. For example a magnetic record may be used. However, several rows of the record may be employed for recording each value of $x$ and $y$, assuming for example that a binary decimal code is used in conjunction with a tape reader similar to a normal teleprinter reader, and the values of $x$ and $y$ need not be arranged in separate columns. The interlock between the shaft 38 and the tape reader may take a variety of forms and may incorporate for example a magslip transmitter and receiver, or a so-called synchro-transmitter or receiver. Furthermore the invention is applicable to machines operating in other co-ordinate systems instead of cartesian co-ordinates as described, and the invention may be applied to machines which can be controlled for relative displacement between the tool holder and the work carrier in three co-ordinate directions. If polar co-ordinates are employed, it will be understood that a linear relationship between the co-ordinates will represent a spiral locus (instead of a straight line) in the two dimensional case. Moreover, whereas in the example described the axis 6 is caused to describe a locus by displacing the work table relative to the tool holder, the tool holder may instead be displaced, or both may undergo relative displacement, say in different co-ordinate directions. The invention is also applicable to control mechanism for machines (other than milling machines) for cutting or otherwise shaping workpieces.

Although the invention is especially applicable to employment of quadratic interpolation, it may also be applied to higher order interpolation, with corresponding advantages. Other interpolating functions may also be used, such as Fourier type functions as described for example in co-pending British patent application Number 30,706/55. Thus in general, the interpolating means may be said to generate the respective output signals as curvilinear functions of the common non-geometric parameter employed.

Instead of recording in the record 20, reference points on the locus of the tool axis, the recorded signals may be reference points on the profile to be cut. In this case provision is required to compensate automatically for the radius of the tool so that the tool axis shall describe the current locus.

What we claim is:

1. An interpolating device comprising means for providing first input signals representing values of a first co-ordinate of successive reference points defining a locus, means for providing second input signals representing values of a second co-ordinate of successive reference points defining said locus, first and second interpolating means each having at least three input terminals and a greater number of output terminals, which output terminals represent values of the variable of the interpolation function, means for applying the first input signals in groups to the input terminals of the first interpolating means and for applying the second input signals in groups to the input terminals of the second interpolating means, each interpolating means including couplings from its input terminals to its output terminals responsive to the applied signals for setting up at the output terminals signals representing values of the respective co-ordinate interpolated according to a curvilinear interpolation function, selector means for deriving interpolated signals in succession from the output terminals of one interpolating means and simultaneously from the output terminals of the other interpolating means, thereby to derive output signals representing values of both co-ordinates as functions of a common parameter, and means responsive to said output signals derived by said selector means for displacement in two co-ordinate directions.

2. Automatic control mechanism capable of controlling relative displacement between two relatively movable members, comprising means for deriving from a record first input signals representing values of a first co-ordinate of successive reference points defining a locus, means for deriving from a record second input signals representing values of a second co-ordinate of successive reference points defining a locus, first and second interpolating means each having at least three input terminals and a greater number of output terminals, which output terminals represent values of the variable of the interpolation function, means for applying the first input signals in groups to the input terminals of the first interpolating means, means for applying the second input terminals in groups to the input terminals of the second interpolating means, each interpolating means including couplings from its input terminals to its output terminals responsive to the applied signals for setting up at the output terminals signals representing values of the respective co-ordinate interpolated according to a curvilinear interpolation function, selector means for deriving interpolated signals in succession from the output terminals of one interpolating means and simultaneously from the output terminals of the other interpolating means, means for producing relative displacement between said members in one co-ordinate direction in response to interpolated signals derived by said selector means from one interpolating means, and means for producing relative displacement between said members in a second co-ordinate direction in response to interpolated signals derived by said selector means from the other interpolating means.

3. A device according to claim 1, wherein the couplings of said first and second interpolating means are predetermined to set up at the output terminals signals which represent the respective co-ordinate interpolated according to a quadratic interpolation function.

4. A device according to claim 1, each interpolating means comprising two sections for interpolating over alternate spans of the interpolation function, each section having its own input terminals at least three in number, and its own output terminals greater in number than its input terminals, said means for applying signals to the interpolating means including means for applying said first input signals alternately in groups to the input terminal of the two sections of the first interpolating means and means for applying said second input signals alternately in groups to the input terminals of the two sections of the second interpolating means, and said selector means including means for deriving output signals from the respective interpolating means alternately from the output terminals of the respective sections thereof, the first and last output terminal of each interpolator section being connected directly to the first and last input terminal of the same section.

5. A device according to claim 1, said coupling from the input to the output terminals of each interpolating means comprising a plurality of transformers.

6. A device according to claim 1 each interpolating means comprising two sections for interpolating over alternate spans of the interpolation function; each section having three input terminals, more than three output terminals and two transformers intercoupling the input terminals with the respective output terminals, with the first and last output terminal of each section coupled directly to the first and last input terminals of the same section; the output terminals of the two sections of one interpolating means being arranged in complementary semi-circles together forming a terminal circle; said selector means comprising a pickup rotatable from one output terminal to the next in the terminal circle for the first interpolating means, a second pick-up rotatable from one output terminal to the next in the terminal circle of said second interpolating means, and drive means for moving said pick-ups synchronously from one terminal to the next of the respective terminal circles.

References Cited in the file of this patent
UNITED STATES PATENTS

| | | |
|---|---|---|
| 2,537,427 | Seid et al. | Jan. 9, 1951 |
| 2,627,055 | Calosi | Jan. 27, 1953 |
| 2,628,539 | Neergaard | Feb. 17, 1953 |
| 2,659,849 | Cunningham | Nov. 17, 1953 |
| 2,685,054 | Brewer et al. | July 27, 1954 |
| 2,784,359 | Kamm | Mar. 5, 1957 |

OTHER REFERENCES

Report entitled, "A Numerically controlled Milling Machine," published by Swomechanisms Laboratory, M.I.T., May 31, 1953, 259 pages.